3,036,976
COATING COMPOSITION COMPRISING SOLVENT, NITROCELLULOSE AND COPOLYMER OF METHYL METHACRYLATE WITH BUTOXYETHYL METHACRYLATE
James J. Sanderson, Lansdowne, Pa., assignor to E. I. du Pont de Nemours and Company, Wilmington, Del., a corporation of Delaware
No Drawing. Filed Apr. 1, 1960, Ser. No. 19,163
2 Claims. (Cl. 260—17)

This invention relates to coating compositions and more particularly to coating compositions containing nitrocellulose and at least one of a specific class of copolymers of methyl methacrylate and esters of methacrylic acid with monoethers of ethylene glycol.

Methyl methacrylate lacquers, that is, coating compositions containing solvent and, as the principal film-forming constituent, polymers predominately of methyl methacrylate have found wide use in recent years because they can be applied to substrates and dried to form films and coatings which have outstanding durability and gloss retention. One of the problems associated with methyl methacrylate lacquers is crazing. "Crazing" refers to a multiplicity of interconnecting cracks which appear in baked methyl methacrylate lacquer coatings when they come in contact with solvent materials, for example, when blemishes in dried methyl methacrylate coatings are refinished. By making dried methyl methacrylate lacquers softer, that is, more thermoplastic, for example, by adding large portions of plasticizers thereto, crazing can be reduced. However, the more thermoplastic the dried coating of methyl methacrylate becomes, the more subject it is to soiling, scratching and marring. Thus, for example, on hot days if an object is placed on a dried coating of methyl methacrylate lacquer which has an amount of plasticizer sufficient to inhibit crazing, the object will leave an imprint in the coating.

Considerable work has been done in recent years to eliminate the aforementioned crazing problem in methyl methacrylate lacquers while retaining the inherent durability and gloss retention thereof. However, heretofore, such work has fallen somewhat short of the desired objective either because an optimum balance of craze resistance and freedom from objectionable thermoplasticity has not been obtained or because modification of the methyl methacrylate lacquers had led to other problems, for example, poor unbuffed gloss.

This invention provides a methyl methacrylate lacquer which has the durability and gloss retention characteristic of conventional methyl methacrylate lacquers and, in addition, has an excellent balance of craze resistance and freedom from objectionable thermoplasticity.

The compositions of this invention comprise solvent and, as the essential film-forming constitutents, (A) 100 parts by weight of at least one copolymer of (1) about from 95 to 40, and preferably about from 90 to 60 parts by weight of methyl methacrylate and (2) about from 5 to 60, and preferably 10 to 40 parts by weight of at least one ester of methacrylic acid with a monoether of ethylene glycol, free of ethylenic unsaturation, having 3 to 10 carbon atoms and (B) about from 5 to 70, and preferably about from 10 to 50 parts by weight of lacquer-grade nitrocellulose.

The esters of methacrylic acid with monoethers of ethylene glycol can be prepared, for example, by reacting the appropriate monoether of ethylene glycol with methacrylic acid or methyl methacrylate, with or without solvent, in the presence of an acidic catalyst such as toluene sulfonic acid, sulfuric acid or phosphoric acid. The reaction can be carried out at temperatures on the order of, for example, 100 to 150° C. for about from 5 to 15 hours. Basic catalysts such as, for example, sodium ethoxide or sodium methoxide can also be used in place of the acidic catalyst when methyl methacrylate is reacted with the monoether of ethylene glycol. Preferably reaction is run at the reflux temperature and the reaction by products, water or methanol, continuously removed. Illustrative esters which can be used in preparing copolymers used in the compositions of this invention are methoxyethyl methacrylate, ethoxyethyl methacrylate, propoxyethyl methacrylate, butoxyethyl methacrylate, hexoxyethyl methacrylate, heptoxyethyl methacrylate, octoxyethyl methacrylate, 2-ethylhexoxyethyl methacrylate, phenoxyethyl methacrylate, toloxyethyl methacrylate, cyclohexoxyethyl methacrylate and mixtures thereof. Butoxyethyl methacrylate is particularly preferred because it yields compositions having an optimum balance of properties characteristic of the compositions of this invention.

Small portions, for example, up to 20% by weight of other copolymerizable monomers can also be copolymerized with the essential constituents of the copolymers used in compositions of this invention. Such copolymerizable materials include, for example, ethyl methacrylate, butyl methacrylate, ethyl acrylate, styrene, methacrylic acid, dimethyl itaconate and the like.

The copolymers of methyl methacrylate with the aforementioned monoethers of ethylene glycol can be prepared by well known methods of polymerizing methyl methacrylate polymers in bulk, in solution or in granular form. Preferably, the reaction is carried out in solution at temperatures on the order of 75 to 140° C. for about from 5 to 20 hours in the presence of free radical catalyst such as, for example, benzoyl peroxide, azobis-(isobutyronitrile), ditertiarybutyl peroxide or the like.

As noted hereinbefore, the copolymers of methyl methacrylate used in the compositions of this invention preferably contain about from 90 to 60 parts of methyl methacrylate and about from 10 to 40 parts of the esters of methacrylic acid with the aforementioned monoethers of ethylene glycol. Copolymers falling within these preferred limits additionally have outstanding overspray compatibility. Frequently, for example, in automobile bodies, adjacent areas may be coated with the same or different methyl methacrylate lacquers. Conventionally, one area is first coated, no particular effort being taken to prevent small portions of the coating compositions from overlapping onto the second area. Next, the edge of the first area is masked and the second area is coated. In the second area where the coating composition thereon is applied over dried lacquer particles, overspray, from the first area, the coating in the second area is rough and uneven because the second coating does not adequately blend with the overspray from the first area. This failure of overspray of one lacquer to blend with a superposed lacquer is called "overspray incompatibility." The rough and uneven coating caused by overspray incompatibility cannot be adequately removed by buffing. Compositions of this invention containing the aforementioned preferred copolymers, have outstanding overspray compatibility and thus can be used adjacent to a wide variety of methyl methacrylate lacquers.

The lacquer-grade nitrocellulose used in the coating compositions of this invention can be any of a wide variety of grades commonly used in nitrocellulose lacquers. One of the most common characteristics used to define the nitrocellulose is viscosity. The most widely used grades have viscosities of ¼ to 5 seconds. These are the most useful grades for this invention although mixtures containing small portions of grades having viscosities as high as 50 or 100 seconds can also be used. Nitrocellulose having a viscosity of ¼ to 1 and particularly ½ second is preferred because such nitrocellulose yields coatings which have an optimum balance of cold-crack and application properties. The ¼ second viscosity corresponds to about 50 centipoises which when measured has a 12.2% solution in the solvent mixture defined in Formula A in A.S.T.M. D301–54T. On the same basis, 5 seconds corresponds to about 1800 centipoises, 50 seconds to about 18,000 centipoises and 100 seconds to about 38,000 centipoises. In order to obtain optimum gasoline resistance, durability and overspray compatibility, the amount of nitrocellulose is held within the aforementioned preferred limits of 10 to 50 parts per 100 parts by weight of copolymer.

The coating compositions of this invention can contain any of a wide variety of conventional additives such as solvents, plasticizers, pigments and extenders, inhibitors, flow-control agents and the like. Examples of solvents and diluents which can be used in preparing the copolymers of methylmethacrylate used in the compositions of this invention and as solvents for the coating compositions thereof are toluene, xylene, ethyl acetate, butyl acetate, butyl ether, acetone, methyl isobutyl ketone, butanol, isopropanol and other aliphatic, cycloaliphatic and aromatic hydrocarbons, esters, ethers, ketones and alcohols such as those which are conventionally used in methyl methacrylate lacquers. Examples of plasticizers which can be used in conventional amounts are benzyl butyl phthalate, butyl cyclohexyl phthalate, dibutyl phthalate, triphenyl phosphate, 2-ethylhexyl benzyl phthalate, di(cyclohexyl)phthalate and mixtures thereof. Benzyl butyl phthalate yields coatings which have a particularly good over-all balance of properties and is preferred. Usually the compositions of this invention contain about from 10 to 60 and preferably 25 to 45% by weight of plasticizer based on the total weight of the aforementioned copolymers and nitrocellulose.

Examples of pigments which can be used in the compositions of this invention are metal oxides, hydroxides, chromates, silicates, sulfides, sulfates, carbonates, organic dyes and lakes thereof and metal flake pigments. Coating compositions of this invention pigmented with carbon black have a unique combination of jet blackness, craze resistance and freedom from objectionable thermoplasticity heretofore unobtainable with known conventional methyl methacrylate lacquers. Most conventional black methyl methacrylate lacquers are not really black, but have a brownish-gray overtone which is readily apparent when such lacquers are compared, for example, with black nitrocellulose lacquers. Conventional black nitrocellulose lacquers, on the other hand, do not have the durabiilty and gloss retention characteristic of methyl methacrylate lacquers. Black coating compositions of this invention are characterized by a jetness and unique balance of properties heretofore unobtainable with the aforementioned conventional lacquers. The amount of pigment used in the compositions of this invention varies as is known in the art with the particular pigment employed. Usually about from 1 to 10, and preferably about from 2 to 6 parts of carbon black are used per 100 parts of film-forming materials and plasticizer.

The coating compositions of this invention can also contain small portions, on the order of up to 20% by weight based on the weight of the aforementioned copolymers and nitrocellulose, of other film-forming materials such as, for example, cellulose acetate butyrate, cellulose acetate propionate, small portions of conventional methyl methacrylate lacquers and the like.

The various ingredients of the coating compositions of this invention can be brought together in accordance with the conventional lacquer formulating techniques in any desired manner to form the finished coating compositions of this invention. Preferably, however, the compositions of this invention are formulated by milling the pigment, usually part of the plasticizer and a small portion of solvent with at least part of the nitrocellulose to form a pasty or even solid mill base. The mill base is then dissolved in a solution of the copolymer, mixed with the remaining plasticizer and other additives, diluted to application viscosity, for example, 10 to 20% solids, with one or more of the aforementioned solvents and applied.

The coating compositions of this invention can be applied by any of the conventional coating techniques such as, for example, flow, dip, spray, brush or roller coating. Although the compositions of this invention can be dried at room temperature, preferably they are air dried at elevated temperature, for example, for 60 to 10 minutes at about 65 to 125° C. Coating compositions of this invention can be used, if desired, directly on bare substrates. Preferably, however, they are applied over conventional primers, sealers and the like. Coating compositions of this invention are particularly suitable in finishing systems for coating steel, especially steel automobile bodies. However, they can also be used in the finishing systems for coating glass, ceramics, wood (when moderate baking temperatures are used) and metals such as aluminum, copper, magnesium and alloys thereof.

The coating compositions of this invention are characterized by a unique balance of craze resistance and freedom from objectionable thermoplasticity. They have excellent unbuffed gloss, durability and gloss retention. Certain preferred compositions of this invention containing copolymers having the preferred portions of methyl methacrylate and the aforementioned esters of methacrylic acid with monoethers of ethylene glycol and the preferred proportions of the nitrocellulose have excellent overspray compatibility, thus are particularly suitable for use in coating articles wherein adjacent areas are coated successively with compositions of this invention or composition and any of the wide variety of other types of methyl methacrylate lacquers. Coating compositions of this invention pigmented with carbon black have a unique combination of jet blackness, durability and gloss retention, craze resistance and freedom from objectionable thermoplasticity unobtainable with other conventional lacquers.

In the following examples which illustrate this invention, parts and percentages are by weight unless otherwise specified.

*Example 1*

Preparation of Copolymer of Methyl Methacrylate and Butoxyethyl Methacrylate

Butoxyethyl methacrylate is prepared by charging 480 parts of n-butoxyethanol, 350 parts of methacrylic acid, 200 parts of toluene, 10 parts of hydroquinone and 4 parts of p-toluene sulfonic acid to a reaction vessel and heating the resulting reaction mixture at a reflux temperature of about 135 to 150° C. for about 5 hours. The water-toluene binary is continuously removed from the reaction mixture, then the toluene is separated and returned to the reaction vessel. The resulting product is then washed to remove hydroquinone and distilled under reduced pressure to yield a monomer boiling at about 114 to 115° C. at a pressure of about 25 millimeters of mercury absolute.

The following materials are charged to a closed reaction vessel and heated for 16 hours at 85° C. under autogenous pressure:

| | Parts |
|---|---|
| Methyl methacrylate | 75 |
| Butoxyethyl methacrylate | 25 |
| Toluene | 75 |
| Acetone | 75 |
| Benzoyl peroxide | 0.6 |

The resulting reaction mixture has a Gardner Holdt viscosity of $L+\frac{1}{2}$ and contains 40% of a copolymer of 75 parts of methyl methacrylate and 25 parts of butoxyethyl methacrylate having a molecular weight of approximately 77,000.

Preparation of Coating Compositions

The following materials are milled with water-wet

½-second nitrocellulose until the water separates therefrom, then the resulting stock is milled an additional 30 minutes at 100° C. to yield a mill base having the following composition:

| | Parts |
|---|---|
| Nitrocellulose | 32.85 |
| Indulin B dye | 0.38 |
| Copper naphthenate | 2.33 |
| Butyl benzyl phthalate plasticizer | 43.6 |
| Carbon black | 20.9 |

The resulting mill base is then dissolved in an equal-weight mixture of butyl acetate and ethyl acetate to yield a mill base solution containing about 25% solids.

The following materials are thoroughly blended:

| | Parts |
|---|---|
| Nitrocellulose (½-second viscosity, 25% solution in butyl acetate and acetone) | 70 |
| Copolymer (40% solution described above) | 130 |
| Butyl benzyl phthalate plasticizer | 19.6 |
| Butyl acetate | 33 |
| Ethyl acetate | 33 |

Finally, the above composition is blended with 58 parts of the aforementioned mill base solution to yield a coating composition of this invention containing, per 100 parts by weight of copolymer of methyl methacrylate and butoxyethyl methacrylate, 42.8 parts of nitrocellulose, 50 parts of plasticizer and 5.8 parts of carbon black pigment.

*Evaluation of Coating Composition*

Steel panels treated with conventional rust inhibitor ("Bonderite" a product of the Parker Rust Proof Company) are primed and sealed in the conventional manner. The prime coat contains about 100 parts of a 52% soya oil modified glyceryl phthalate resin as the film-forming material and a pigment consisting of 39 parts of calcium carbonate, 9 parts of carbon black and 5 parts of zinc chromate. The sealer or undercoat, which is unpigmented, contains, as the principal film-forming material, an ammoniated copolymer of 97.8% of methyl methacrylate and 2.2% of glycidyl methacrylate. Finally, the coating composition of this invention described above is sprayed over the primed and sealed panels and baked for 45 minutes at 93° C. to yield a topcoat about 2 mils thick. The coated panels have a jet black color equivalent to that of panels having a conventional topcoat of standard black nitrocellulose lacquer such as that sold by E. I. du Pont de Nemours and Company under the proprietary name of "Duco" for use in finishing steel automobile bodies. The coatings did not have any undesirable brownish-gray overtone.

The thermoplasticity of the coatings is determined by measuring the print resistance thereof. This is done by laying a gauze over the dried coating and applying a pressure of 4 pounds per square inch to the gauze. After the samples are held for one hour at 66° C., the pressure is removed and the impression, if any, of the gauze in the coating is noted. The coatings are given a rating from 2 to 10. A rating of 2 shows complete failure, that is, the gauze cuts through the topcoat to the primer and sticks to the topcoat. A rating of 5 is good, that is, it represents minor marring of the coating; a rating of 6 to 10 is excellent and represents little or no marring of the coating. The coating compositions described above have a rating of greater than 6.

Craze resistance is determined by aging the panels for 48 hours at 65° C., chilling them in an atmosphere at about 15° C. and 40% relative humidity and finally recoating one-half the panels with the coating composition of this invention described above and coating the other half of the panels with a mixture of acetone, toluene and xylene. No crazing is observed in either half of the panels.

Overspray compatibility is determined by masking one-half of the panels, then spraying the unmasked half of the panels with the conventional methyl methacrylate lacquer from a distance to deposit discrete particles of polymer thereon. Next, the masking tape is removed from the first half of the panels and the entire panel is coated with the composition of this invention. The previously masked and unmasked halves of the panel are compared and found to have the same smooth, even, glossy appearance, thus showing excellent overspray compatibility.

The dried coating on the above panels also has good cold-crack resistance. Cold-crack resistance is determined by alternately subjecting the above panels to an atmosphere at a temperature of 38° C. and 100% relative humidity and an atmosphere at −18° C. The dried coatings of the composition of this invention described above have excellent gasoline resistance. When gasoline is dropped onto the coatings and allowed to evaporate, there is no ring or other blemish left on the coatings. The dried coatings of this invention described above have a Tukon hardness of 5.7 Knoop units. They also have excellent durability, unbuffed gloss and gloss retention.

If an equal weight of a homopolymer of methyl methacrylate is substituted for the copolymer of methyl methacrylate and butoxyethyl methacrylate used in this example, dried coatings of the resulting coating composition develop many large interconnecting cracks in the crazing test described above; also, the coatings are not jet black.

EXAMPLE 2

A copolymer is prepared from 85 parts of methyl methacrylate and 15 parts of butoxyethyl methacrylate by a procedure substantially similar to that described in Example 1. A coating composition having the following over-all composition is prepared from the above polymer:

| | Parts |
|---|---|
| Copolymer (85% methyl methacrylate, 15% butoxyethyl methacrylate) | 100 |
| Nitrocellulose (½-second viscosity) | 19 |
| Benzyl butyl phthalate plasticizer | 39.3 |
| Carbon black pigment | 4.8 |

The resulting coating composition is coated onto steel panels and tested by the procedures described in Example 1. The baked coating had a jet black color, a print resistance of greater than 5 and a hardness of 8.5 Knoop units. The coating composition has excellent overspray compatibility.

If 10 parts of cellulose acetate butyrate is added to the coating composition of this example described above, a product with similar desirable properties is obtained.

EXAMPLE 3

Phenoxyethyl methacrylate is prepared by heating 602 parts of methacrylic acid and 965 parts of phenoxyethanol, 515 parts of toluene, 22 parts of hydroquinone and 5 parts of p-toluene sulfonic acid at reflux (about 120 to 135° C.) for about 10 hours. The water-toluene binary is continuously removed and the toluene separated therefrom and recycled. The resulting product is fractionally distilled to yield a product boiling between about 109 and 116° C. at a pressure of 4 millimeters of mercury absolute.

The following materials are charged to a reaction vessel and heated under autogenous pressure for 16 hours at 85° C.:

| | Parts |
|---|---|
| Methyl methacrylate | 120 |
| Phenoxyethyl methacrylate | 80 |
| Toluene | 171 |
| Acetone | 73 |
| Benzoyl peroxide | 1.2 |

The resulting reaction mixture contains 44.4% solids and has a Gardner-Holdt viscosity of V+½.

A coating composition having the following over-all composition is prepared by a procedure substantially similar to that described in Evample 1:

| | Parts |
|---|---|
| Copolymer (60% of methyl methacrylate, 40% phenoxyethyl methacrylate) | 100 |
| Nitrocellulose (½-second viscosity) | 37 |
| Benzyl butyl phthalate plasticizer | 48 |
| Carbon black | 5.6 |

The coating composition described above is coated onto primed and sealed steel panels and tested as described in Example 1. The resulting dried coating has a jet-black color, a hardness of 7.4 Knoop units, a print resistance of greater than 5, shows no crazing and has good cold-crack resistance. The overspray compatibility of the composition described above is excellent.

If an equal weight of a copolymer of 75% of methyl methacrylate and 25% of methoxyethyl methacrylate is substituted for the copolymer used in this example, substantially similar results are obtained.

EXAMPLE 4

A terpolymer is prepared by charging the following materials to a reaction vessel, then heating the resulting reaction mixture under autogenous pressure for 16 hours at 85° C.:

| | Parts |
|---|---|
| Methyl methacrylate | 140 |
| Ethyl methacrylate | 40 |
| Butoxyethyl methacrylate | 20 |
| Toluene | 210 |
| Acetone | 90 |
| Benzoyl peroxide | 1.0 |

The reaction mixture contains 39% solids and has a Gardner-Holdt viscosity of about V+½.

Using the general procedure described in Example 1, a coating composition is prepared from the following materials:

| | Parts |
|---|---|
| Copolymer (39% solution described above) | 139 |
| Nitrocellulose (½-second viscosity, 26.2% solution in butyl acetate and acetone) | 35.5 |
| Nitrocellulose (5-second viscosity, wet with 25% of isopropanol) | 8.0 |
| Benzyl butyl phthalate plasticizer | 19.7 |
| Mill base solution (similar to that described in Example 1) | 60 |
| Butyl acetate | 41 |
| Ethyl acetate | 41 |

The resulting coating composition has the following over-all composition per 100 parts by weight of copolymer: 37 parts of nitrocellulose, 48 parts of plasticizer and 5.6 parts of carbon black. The dried coatings of the composition have a jet black color, a print resistance of greater than 6, a hardness of 10.8 Knoop units and good craze resistance. The composition also has good overspray compatibility.

EXAMPLE 5

A copolymer is prepared by heating the following materials in a closed reaction vessel at about 85° C. for 16 hours under autogenous pressure:

| | Parts |
|---|---|
| Methyl methacrylate | 146 |
| Butoxyethyl methacrylate | 50 |
| Methacrylic acid | 4 |
| Toluene | 170 |
| Acetone | 74 |
| Benzoyl peroxide | 1.2 |

The resulting reaction mixture contains 44.6% of copolymer and has a Gardner-Holdt viscosity of Z+¼.

A coating composition of this invention is prepared by mixing the following materials by the general procedure described in Example 1.

| | Parts |
|---|---|
| Copolymer (44.6% solution described above) | 115 |
| Nitrocellulose (½-second viscosity, 25% solution in butyl acetate and ethyl acetate) | 69 |
| Benzyl butyl phthalate plasticizer | 20.7 |
| Mill base solution (similar to that described in Example 1) | 58 |
| Butyl acetate | 40 |
| Ethyl acetate | 40 |

The over-all composition of the resulting product, per 100 parts by weight of coplymer, is: 43 parts of nitrocellulose, 53 parts of plasticizer and 5.7 parts of carbon black pigment.

The coating composition described above is applied to primed and sealed steel panels and tested as described in Example 1. The coating composition has a jet-black color, a print resistance of greater than 6, a Knoop hardness of greater than 5 and good craze resistance.

EXAMPLE 7

A copolymer is prepared by heating the following materials in a closed reaction vessel and under autogenous pressure at 85° C. for 16 hours:

| | Parts |
|---|---|
| Methyl methacrylate | 70 |
| Butoxyethyl methacrylate | 25 |
| Dimethyl itaconate | 5 |
| Toluene | 85 |
| Acetone | 37 |
| Benzoyl peroxide | 0.6 |

The resulting reaction mixture contains 43% solids and has a Gardner-Holdt viscosity of V.

A coating composition is prepared by the general procedure described in Example 1 to yield a product having the following over-all composition:

| | Parts |
|---|---|
| Copolymer (70% methyl methacrylate, 25% butoxyethyl methacrylate, 5% dimethyl itaconate) | 100 |
| Nitrocellulose (½-second viscosity) | 30 |
| Benzyl butyl phthalate plasticizer | 35 |
| Carbon black pigment | 4 |

Dried coatings of the resulting coating composition have a jet-black color, a print resistance of greater than 6, a hardness of 6.4 Knoop units and good craze resistance. They also have good overspray compatibility.

EXAMPLE 8

A coating composition is prepared by blending the following materials by the general procedures described in Example 1:

| | Parts |
|---|---|
| Copolymer of 75% of methyl methacrylate and 25% of butoxyethyl methacrylate (39% solution) | 132 |
| Nitrocellulose (½-second viscosity, 26% solution in butyl acetate) | 58 |
| Butyl cyclohexyl phthalate plasticizer | 17.2 |
| Butyl benzyl phthalate plasticizer | 5.1 |
| Mill base (21% solution similar to that described in Example 1) | 68 |
| Butyl acetate | 33 |
| Ethyl acetate | 33 |

The resulting coating composition had the following over-all composition, per 100 parts by weight of copolymer: 39 parts of nitrocellulose, 22 parts of benzyl butyl phthalate, 33 parts of butyl cyclohexyl phthalate, and 5.8 parts of carbon black.

The coating composition described above is coated onto primed and sealed panels and tested as described in Example 1. The resulting dried coating composition has a jet-black color, a print resistance of greater than 6, excellent craze resistance, good cold-crack resistance and shows good overspray compatibility.

EXAMPLE 9

A coating composition is prepared from the following materials:

| | Parts |
|---|---|
| Copolymer (44.6% solution of copolymer of 70% of methyl methacrylate, 20% of ethyl methacrylate and 10% of butoxyethyl methacrylate) | 485 |
| Nitrocellulose (5-second viscosity, 22% solution in equal-weight mixture of butyl acetate and acetone | 143 |
| Nitrocellulose (½-second viscosity, 25% solution in butyl acetate) | 196 |
| Benzyl butyl phthalate plasticizer | 104 |
| Toluene | 246 |
| Paste of 65% aluminum flake pigment in 35% hydrocarbon solvent | 62 |
| Butyl acetate | 246 |

The paste of aluminum flake is first thoroughly mixed with the toluene, then the other constituents were thoroughly blended therewith to yield coating compositions of this invention. The coating composition contains, per 100 parts by weight of copolymer, 37 parts of nitrocellulose, 48 parts of plasticizer and 18.5 parts of pigment.

A composition similar to that described above is prepared by substituting 92.8 parts of titanium dioxide for the 18.5 parts of aluminum flake pigment used above and thoroughly grinding the titanium dioxide with the other components of the composition.

I claim:

1. A coating composition which comprises solvent and, as the essential film-forming constituents, (A) 100 parts by weight of at least one copolymer comprising 95 to 40 parts by weight of methyl methacrylate and about from 5 to 60 parts by weight of butoxyethyl methacrylate, and (B) about from 5 to 70 parts by weight of lacquer-grade nitrocellulose.

2. A coating composition which comprises solvent and, as the essential film-forming constituents, (A) 100 parts by weight of at least one copolymer comprising about from 90 to 60 parts by weight of methyl methacrylate and about from 10 to 40 parts by weight of butoxyethyl methacrylate, and (B) about from 10 to 50 parts by weight of lacquer-grade nitrocellulose.

References Cited in the file of this patent
UNITED STATES PATENTS

| 2,129,694 | Izard | Sept. 13, 1938 |
| 2,860,110 | Godshalk | Nov. 11, 1958 |